Feb. 24, 1970  R. C. DIVELY  3,497,185
AERATING AND COOLING APPARATUS
Filed Nov. 20, 1968  3 Sheets-Sheet 1
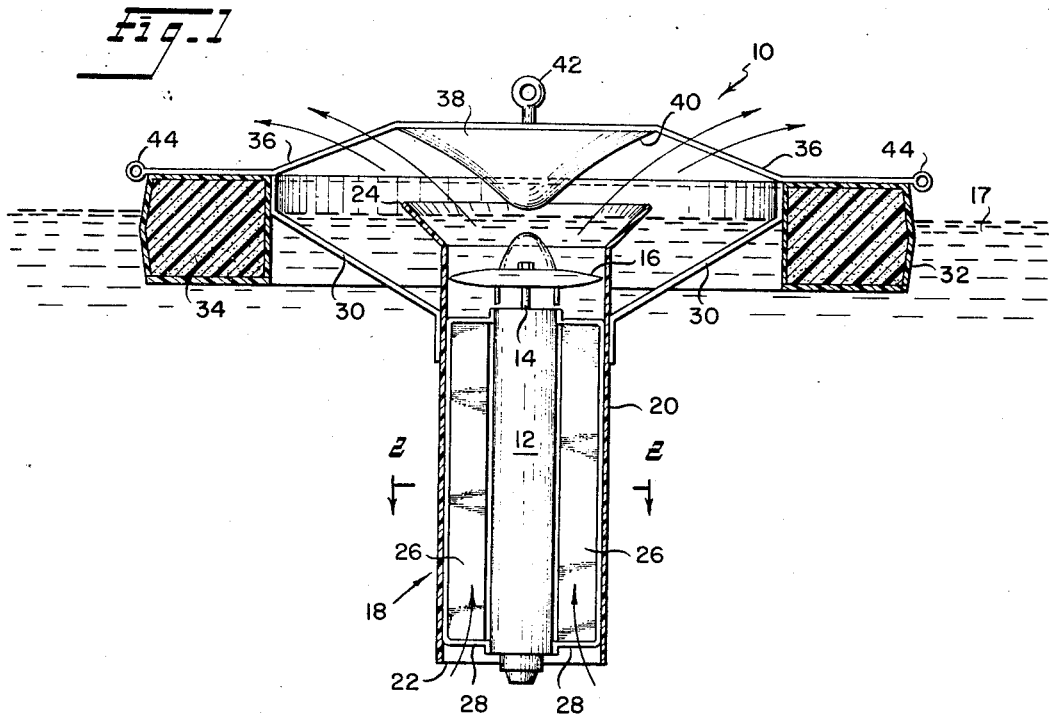
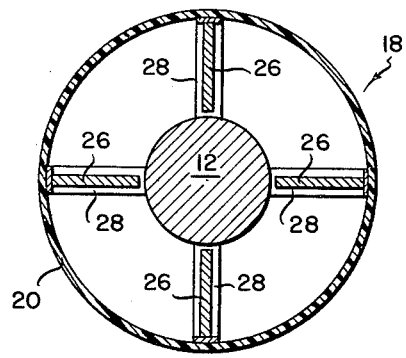
INVENTOR
Robert C. Dively
BY  *Low & Matthews*
ATTORNEYS Feb. 24, 1970  R. C. DIVELY  3,497,185
AERATING AND COOLING APPARATUS
Filed Nov. 20, 1968  3 Sheets-Sheet 2
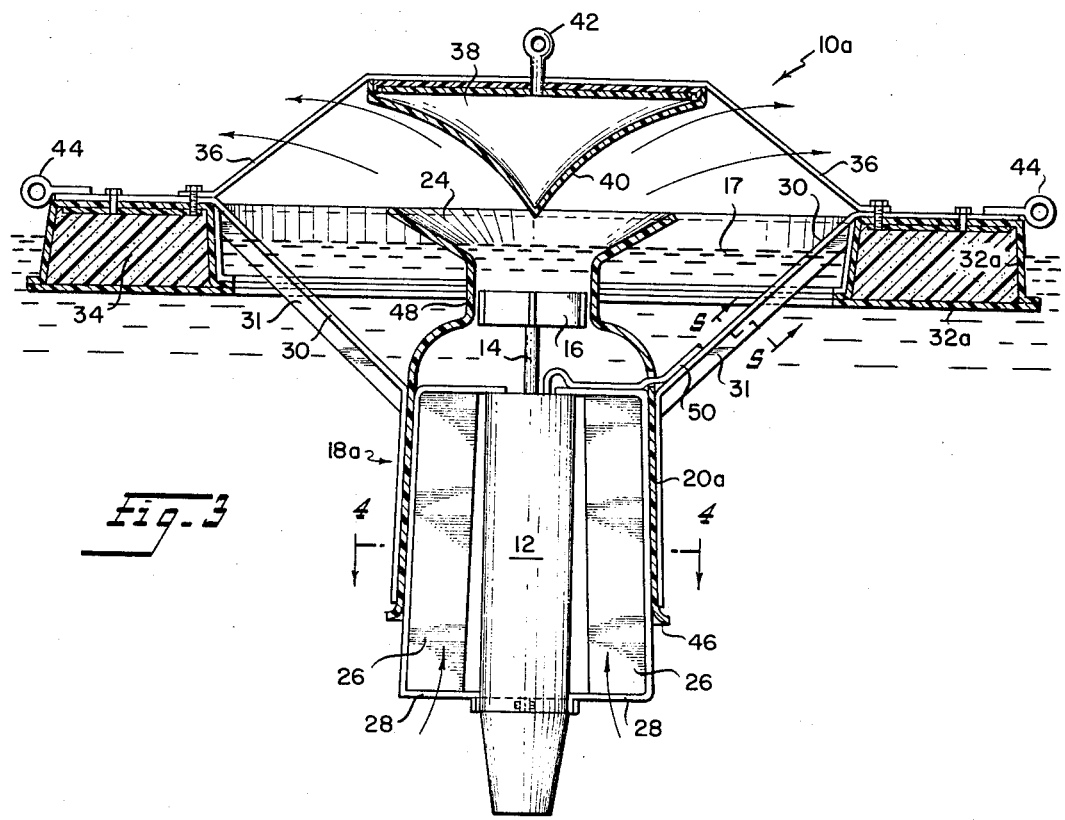
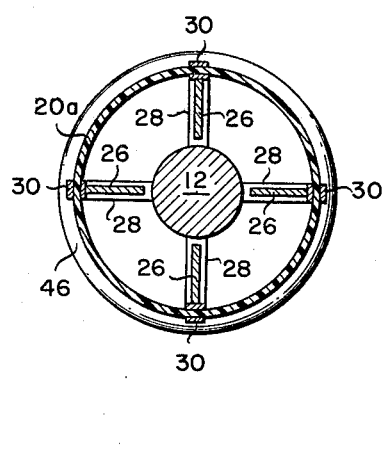
INVENTOR
Robert C. Dively
BY
Low & Matthews
ATTORNEYS INVENTOR
Robert C. Dively BY Low & Matthews

ATTORNEYS

United States Patent Office 3,497,185
Patented Feb. 24, 1970

3,497,185
AERATING AND COOLING APPARATUS
Robert C. Dively, Richmond, Va., assignor to Sydnor Hydrodynamics Inc., Richmond, Va., a corporation of Virginia
Filed Nov. 20, 1968, Ser. No. 777,440
Int. Cl. C02c 1/10; B05b 17/00
U.S. Cl. 261—36                                   21 Claims

ABSTRACT OF THE DISCLOSURE

An aerating and cooling apparatus for use in a sewage and industrial waste treatment system having a submerged motor and propeller driven thereby. The motor is provided with shroud means which directs water over the motor to provide cooling therefor and carries a plurality of vanes to prevent the formation of a vortex. The shroud means is supported by a framework to which at least one float member is attached in order to float the entire assembly. In one form of the invention, a deflector is positioned above the submerged motor and propeller so as to deflect the water radially outwardly therefrom thereby establishing a desired pattern of water movement and aeration thereof. In another form of the invention, the deflector is removed and the apparatus is used to cool water by spraying it vertically upwardly into the air.

---

This invention relates to an aerating apparatus for use in a sewage and industrial waste treatment system and more particularly to a floating aerating device wherein a submerged aerating motor is provided with means for cooling the motor and for preventing the formation of a vortex.

In sewage treatment systems wherein floats are used to maintain a propeller of a pumping unit at a relatively constant depth within the liquid of a treating pond or the like, it has been known to mount the motor drive both above and below the water level. It has been recognized that a submerged mounting for the motors is preferable because this construction provides a lower center of gravity thereby eliminating the need for oscillation dampeners and the like and in general making a much more stable installation.

Considerable difficulty, however, has been experienced with submerged motors in that contrary to what might be expected, the motors become overheated because of an inadequate circulation of the stagnant liquid, customarily water, and because of the creation of a vortex when the motor is in operation which reduces pumping efficiency and draws air with the water. As a result the motors have been burned out in very short order.

The foregoing difficulties and shortcomings experienced in prior art devices have been effectively overcome in accordance with the present invention wherein a novel submersible motor mounting which includes a motor encircling shroud effectively directs the water over the motor so as to cool the motor and ensure long life of the motor. In addition, means are provided for preventing the formation of a vortex which thereby ensures a greater pumping efficiency and provides for a controlled water velocity to keep the motor cool.

In one embodiment of the invention a deflector is positioned above the submerged motor and propeller so as to deflect the water radially therefrom thereby establishing a desired circulation of water and aeration thereof. By this procedure sufficient oxygen is supplied to the water which sustains bacteriological feeding on waste materials in the pond. In a second embodiment of the invention the deflector is removed and the apparatus is used to cool the water by spraying it vertically upwardly into the air. In each form of the invention the motor and shroud assembly is supported by means which includes at least one float member.

The shroud is provided with a plurality of vanes which are positioned interiorly thereof to prevent the spiraling of water over the exterior surface of the motor, and thereby prevent the formation of a vortex. In one form of the invention the shroud is substantially cylindrical except for the provision of a flared upper end which permits the water to be directed toward a deflector means preferably having an exterior surface which is parabolic. In another form of the invention the shroud tapers constantly toward a necked-in portion thereof wherein the propeller is positioned thereby creating substantially a venturi effect. In each form of the invention the shroud is of such a length as to ensure that the water enters between the shroud and the motor at a sufficiently low level in the treating pond to ensure that there is no effective short circuiting of the liquid which would be caused by drawing only on water which is located at or near the surface of the treating pond. Therefore, it is possible to obtain extended aeration of waste materials which are consumed by bacteria or oxidation and to obtain cooling of the liquids by convection and evaporation.

Because the apparatus utilizes a submerged motor the center of gravity is sufficiently low to avoid tip-over problems or adverse canting of the apparatus caused by ice loading the upper portions thereof.

The particular design provides easy accessibility to the propeller so that it may be removed along with the motor and shroud without removing the entire apparatus from the sewage and industrial waste treatment pond. The shroud, deflector element and float encasement members are preferably made from a low-cost, non-corrosive material such as Fiberglas. Such a material offers long life with no corrosion from any liquid. The design is also light in weight and does not provide any long shaft extensions.

The inherent advantages and improvements of the present invention will become more readily apparent upon considering the following detailed description of the invention and by reference to the drawings, in which:

FIG. 1 is an elevational view partially in vertical cross section of an aerating apparatus made in accordance with the present invention;

FIG. 2 is a plan view in horizontal cross section taken along line 2—2 of FIG. 1;

FIG. 3 is an elevational view in vertical cross section illustrating a modified form of the present invention;

FIG. 4 is a plan view in horizontal cross section taken along line 4—4 of FIG. 3;

FIG. 5 is an elevational view in vertical cross section taken along line 5—5 of FIG. 3;

Figure 6:
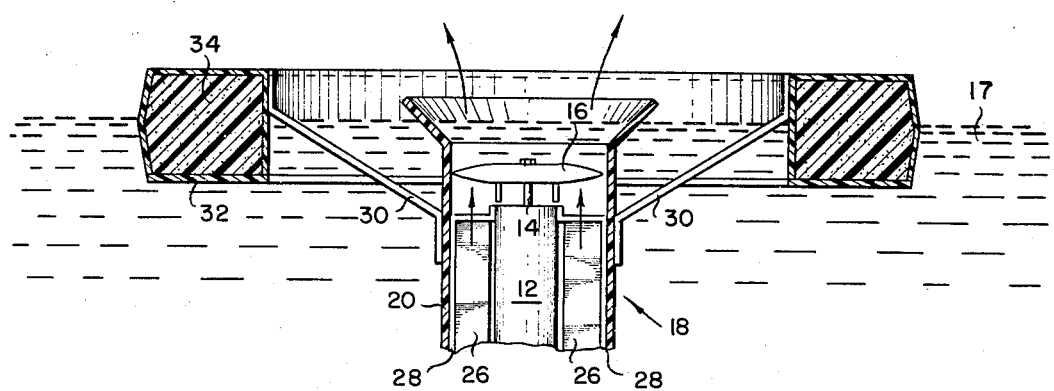
FIG. 6 is a fragmentary elevational view partially in vertical cross section illustrating another application of the present invention.

Referring now to FIG. 1, there is illustrated an aerating apparatus, indicated generally at 10, of the type employing a submerged motor 12. The outlet shaft 14 of motor 12 carries a propeller 16 which is used to project the liquid 17 of the sewage and industrial waste pond or other stationary body of liquid, usually water.

Shroud means is indicated generally at 18 for the motor 12. Shroud means 18 consists of a shroud wall 20 which is shown to be substantially cylindrical in cross section in FIG. 1. Shroud means 18 is provided with an open lower end 22 and an open upper end adjacent an outwardly flared mouth 24. A plurality of vanes 26 are attached to a vane guide bracket 28 which in turn is attached to the inner surface of shroud means 18 and to motor 12. Thus it is possible for liquid to enter the open lower end 22 of shroud means 18 and to be directed by the shroud means 18 and longitudinally extending vanes 26 to pass over and cool the motor 12. The existence of vanes 26 prevents the liquid from spiraling and hence from forming a vortex when the motor 12 drives propeller 16. This not only ensures an adequate supply of liquid to cool motor 12 but also results in greater pump efficiency.

The supporting means for the shroud and motor assembly comprises a plurality of lower support arms or brackets 30 which are attached externally to the shroud means 18 and extend upwardly and outwardly to a frame 32 within which is deposited a float member 34 consisting preferably of urethane foam or other plastic material. Similarly, upper support arm 36 is attached to the upper surface of frame 32 and support a deflector member 38 directly over the outlet of propeller 16. Deflector member 30 is provided with an external surface 40 which is parabolic in shape. The deflector member 38 is at least partially out of contact with the water whereby its parabolic outer surface 40 is used effectively to deflect the water, which is thrust upwardly by the motor driven propeller 16, outwardly in the direction indicated by the arrows. In this manner there is a continuous flow of water which passes upwardly between vanes 26 and interiorly of shroud means 18, past propeller 16 to the deflector 38 and then outwardly so as to impart oxygen to the water and satisfy the bacterial oxygen demand in the treating pond.

The aerating apparatus 10 is provided with means to lift the apparatus and position it on the pond which includes eyelet 42 which is positioned atop the deflector 38 and a plurality of eyelets 44 extending outwardly from the frame 32 which permit stabilization of the aerating apparatus by guide wires and the like passing through eyelets 44.

In FIG. 2 the position of vanes 26 with respect to motor 12 may be observed. Vanes 26 are suitably attached, such as by welding, to vane guide bracket 28 which it itself attached by suitable means, such as by bolting, not shown, to the motor 12.

Referring now to FIG. 3, there is illustrated a modified form of the aerating apparatus principally in the provision of a modified shroud means indicated generally at 18a in FIG. 3. The wall of shroud means 18a is indicated at 20a which is provided with a slightly inwardly tapering surface proceeding from its open bottom end upwardly toward the propeller 16. As in the previous embodiment, the motor 12 is submerged and its output shaft 14 carries a propeller 16. The propeller 16 is positioned in the neck 48 of shroud means 18a which may be facilitated by using a slot construction (not shown) on the vertical legs of the lower support arms or brackets 30. Similarly, a slotted construction may also be employed in the vertical legs of the lower supporting arms 30 in the FIG. 1 embodiment. The continuously tapering surface in the shroud means 18a as it approaches the propeller 16 located in neck 48 produces a venturi effect for the water passing over motor 12. An electrical lead 50 in FIG. 3 schematically indicates the electrical power supplied to the motor 12 with a similar arrangement being provided in FIG. 1 though not shown. The lower end of the wall 20a of the FIG. 3 embodiment is illustrated to be outwardly flared at 46 which facilitates direction of the liquid from the treating pond over motor 12 so as to provide adequate cooling therefor.

FIGURES 2 and 4 illustrate the details of the vane arrangement whereas FIG. 5 shows in cross section a reinforcing member 31 for the lower support arm or bracket 30 which provides additional rigidity thereto.

Turning now to FIG. 6, there is illustrated a further use of the submersible motor mounting of the present invention wherein the deflector element 38 and associated upper support arms 36 are eliminated which permits the apparatus to function as a water cooling mechanism by spraying the water vertically upwardly into the air. The arrangement illustrated in FIG. 6 is in other respects similar to that shown in the FIG. 1 embodiment.

Figure 7:
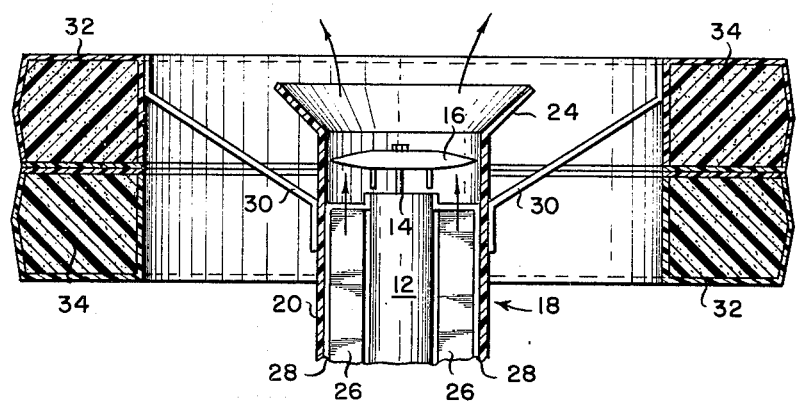
FIG. 7 is a fragmentary elevational view partially in vertical cross section illustrating a modified floating member.

Referring now to FIG. 7, there is illustrated a further embodiment of the present invention wherein a plurality of float members 34 and associated frame members 32 are employed. In this embodiment the float members are stacked vertically with one float member being a mirror image of the other. The float members may be attached together by bolt means interconnecting the frame members 32, not shown. Similarly, the float members of the style indicated at 32a in FIG. 3 may also be used in double form with the float member stacked vertically and the float member being a mirror image of the other. These embodiments wherein a plurality of float members are employed provide additional buoyancy for the apparatus but do not increase the width of the apparatus which greatly facilitates transportation of the apparatus along highways and the like.

The use of a shroud in the manner illustrated not only provides proper cooling of the motor and thereby prevents the motors from burning out but also provides improved pumping efficiency in that the housing is closely coupled to the motor. The vanes which prevent the formation of vortex also ensures that the submerged motors may be used for extended periods of time.

In a typical application the motor may consist of a five horsepower motor and the propeller 16 is located a distance of approximately three inches below the surface of the water in the sewage treating pond. Water pumping in the order of 2000 gallons per minute is typical for installations of this sort which are intended to satisfy the bacterial oxygen demand for the sewage treating pond. Because the propeller is located such a short distance below the surface of the liquid in the pond it is easily accessible and may be replaced readily. The material used for the shroud, deflector and casing of the float members is preferably a low cost, non-corrosive material such as Fiberglas. This provides an extremely lightweight unit and one in which there is no long shaft extensions.

It is thought that the invention and many of its attendant advantages will be understood from the foregoing description, and it will be apparent that various changes may be made in the form, construction and arrangement of the parts without departing from the spirit and scope of the invention, the forms hereinbefore described being merely preferred embodiments thereof.

What is claimed is:
1. An aerating and cooling apparatus comprising
 (a) a motor submerged in a liquid,
 (b) a propeller driven by said motor,
 (c) shroud means encircling and spaced from said motor and having opposed ends open,
 (d) said shroud means directing said liquid over said motor to cool said motor,
 (e) means between said shroud and said motor for preventing a vortex when said motor drives said propeller,
 (f) and support means to support said motor and said shroud means,
 (g) said support means including at least one float member.

2. An aerating and cooling apparatus as defined in claim 1, wherein said means for preventing a vortex when said motor drives said propeller includes a plurality of vanes positioned interiorly of said shroud means.

3. An aerating and cooling apparatus as defined in claim 1 including a deflector means positioned above said motor and at least partially above the level of said liquid.

4. An aerating and cooling apparatus as defined in claim 1, wherein said support means further includes a plurality of support arms each of which is affixed at one end to said shroud means and affixed at the other end to said float member.

5. An aerating and cooling apparatus as defined in claim 1, wherein the longitudinal axis of said motor is maintained substantially vertical and said encircling shroud means therefor has an upper open end with an outwardly flared mouth.

6. An aerating and cooling apparatus as defined in claim 1, wherein said encircling shroud means is tapered to provide a continuously decreasing cross-sectional area between said motor and said shroud for liquid approaching said propeller.

7. An aerating and cooling apparatus as defined in claim 2, wherein said vanes are substantially radial with respect to said motor.

8. An aerating and cooling apparatus as defined in claim 1, wherein the longitudinal axis of said motor is maintained substantially vertical and said encircling shroud means therefor has an open lower end which extends sufficiently far down into the liquid to ensure that liquid is drawn into said shroud from well below the surface of the liquid and is then directed over said motor.

9. An aerating and cooling apparatus as defined in claim 8, wherein said encircling shroud means further has an open upper end with an outwardly flared mouth.

10. An aerating and cooling apparatus as defined in claim 3, wherein said deflector means causes liquid from said propeller to fan out radially with respect to the longitudinal axis of said motor.

11. An aerating and cooling apparatus as defined in claim 4, wherein the outer surface of said deflector means is parabolic.

12. An aerating and cooling apparatus as defined in claim 1, wherein said support means includes a plurality of float members.

13. An aerating and cooling apparatus as defined in claim 12, wherein said support means includes a pair of float members stacked vertically with one float member being a mirror image of the other.

14. An aerating and cooling apparatus as defined in claim 1 wherein said shroud means encircling said motor is made of Fiberglas.

15. An aerating and cooling apparatus as defined in claim 1 wherein said shroud means is provided with a necked-in portion and said propeller is positioned within said necked-in portion.

16. A submersible motor mounting comprising
  (a) an open-ended shroud encircling and spaced from a submerged motor to direct liquid over the motor to cool said motor,
  (b) means for preventing a vortex in the space between said motor and said shroud carried by said shroud,
  (c) and support means to support said motor and said shroud in a body of liquid,
  (d) said support means including at least one float member.

17. A submersible motor mounting as defined in claim 16 wherein said means for preventing a vortex carried by said shroud includes a plurality of vanes positioned interiorly of said shroud.

18. A submersible motor mounting as defined in claim 16 wherein said support means further includes a plurality of support arms each of which is affixed at one end to said shroud and affixed at the other end to said float member.

19. A submersible motor mounting as defined in claim 16 wherein said support means includes a plurality of float members.

20. A submersible motor as defined in claim 19 wherein said support means includes a pair of float members stacked vertically with one float member being a mirror image of the other.

21. A submersible motor mounting as defined in claim 16 wherein said shroud encircling said motor is made of Fiberglas.

References Cited
UNITED STATES PATENTS

| | | |
|---|---|---|
| 2,394,860 | 2/1946 | Korte. |
| 3,033,372 | 5/1962 | Riddick. |
| 3,086,472 | 4/1963 | Lorenzetti. |
| 3,101,173 | 8/1963 | Jennings _____ 239—23 |
| 3,189,334 | 6/1965 | Bell. |
| 3,193,260 | 7/1965 | Lamb. |
| 3,206,176 | 9/1965 | Peterson. |
| 3,210,053 | 10/1965 | Boester. |
| 3,218,042 | 11/1965 | Crabattari et al. |
| 3,228,526 | 1/1966 | Crabattari et al. |
| 3,318,252 | 5/1967 | Nichols. |
| 3,320,160 | 5/1967 | Welles et al. |
| 3,416,729 | 12/1968 | Ravitts et al. _____ 261—91 |
| 3,418,236 | 12/1968 | Mail. |
| 3,439,807 | 4/1969 | Danjes. |

HARRY B. THORNTON, Primary Examiner

STEVEN H. MARKOWITZ, Assistant Examiner

U.S. Cl. X.R.

210—219, 242; 239—23; 261—88, 91